April 24, 1934. O C. BRITSCH 1,955,901
CASING OR HOUSING
Filed Jan. 15, 1932
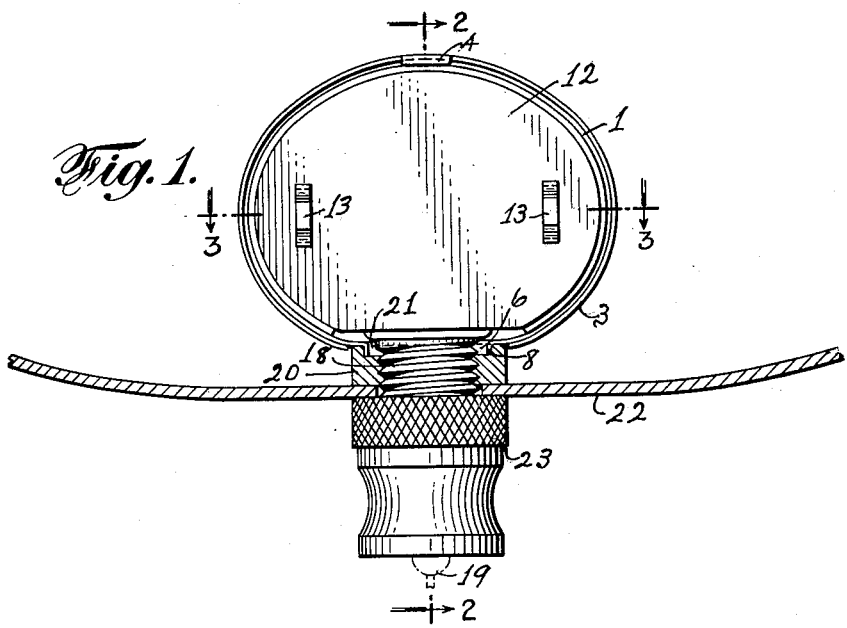
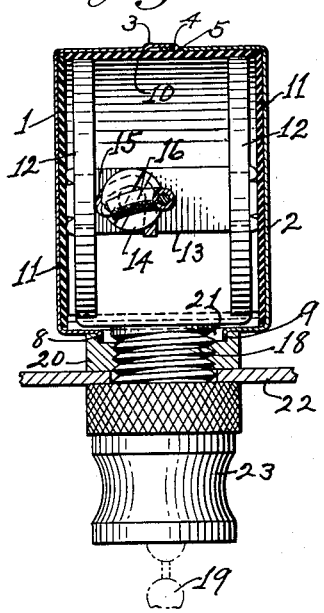
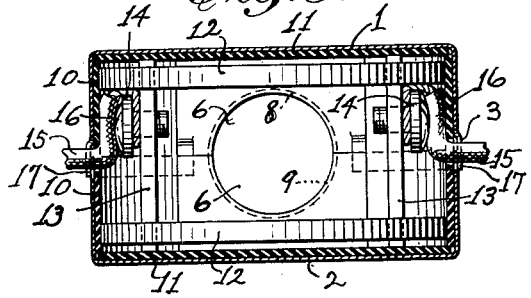
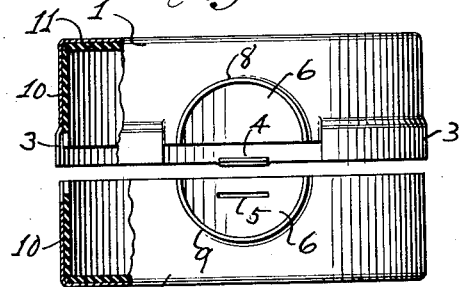
INVENTOR
Otto C. Britsch
BY
Gifford, Scull & Burgess
ATTORNEYS Patented Apr. 24, 1934

1,955,901

UNITED STATES PATENT OFFICE 1,955,901

CASING OR HOUSING

Otto C. Britsch, Woodhaven, N. Y., assignor to Henry Hyman, Brooklyn, N. Y.

Application January 15, 1932, Serial No. 586,940

6 Claims. (Cl. 200—168)

This invention relates to a casing that is especially useful for housing an electric switch but is not restricted to this particular use. The casing is made in separable parts which can be held in assembled relation by a nut on a screw-threaded member connected to the switch mechanism in such a manner that it can be easily opened.

The invention will be understood from the description in connection with the accompanying drawing, in which Fig. 1 is a side view showing one section of a casing with a switch mechanism therein and the device connected to a canopy; Fig. 2 is a section along the line 2—2 of Fig. 1; Fig. 3 is a section at right angles to Fig. 2, and Fig. 4 is a side view of the casing, partly broken away, showing the sections slightly separated.

In the drawing, reference characters 1 and 2 indicate the two sections or separable portions of the casing, each of such a size and shape that the edge of one can be brought into contact with the edge of the other one. The section 1 is provided with a flange 3 along its edge in position to overlap the edge of the section 2 when the sections are assembled. The flange 3 may be made by expanding the edge of the metal of the section 1, or it may be a separate strip attached to the section 1 by soldering or in any other convenient manner. A lip or curved projection 4 is provided on the edge of the flange 3 to enter a slot 5 near the edge of the section 2, thus providing a hinge connection of the two sections on one side.

A semi-circular opening 6 is provided along the edge of each section 1 and 2 opposite the sides that are hinged together to form a circular opening into the casing. A flange 8 is provided on the section 1 around the semi-circular opening 6 and a corresponding flange 9 is provided on the section 2 around the other semi-circular opening.

The inside of the casing is lined with insulating material. The curved surfaces of the sections are provided with insulating material 10 and the flat or end portions are provided with insulating material 11.

The casing can be made of such shape and size as to accommodate switching mechanism of different sorts. In the illustrative embodiment of the invention, only sufficient portions of switch mechanism of a common type are indicated to illustrate the invention. The flat, oval-shaped side members 12 of the switch mechanism are made of stiff insulating material and cross members 13 of metal connect the side members 12. The cross members 13 may extend through openings in the side members 12 and the ends thereof may be riveted to hold the parts together. A binding post 14 is provided on each cross member 13 near one of the side members 12 and the ends of two wires 15 of an electric circuit are connected to the binding posts 14. The electric wires 15 pass from the binding posts along the inside surface of the insulating material 10 parallel to the wall of the casing, as indicated at 16, and thence out through openings 17 on opposite sides of the casing near the junction line of the two sections of the casing. In this way any tension or pull on the wires 15 will not be transmitted directly to the binding posts 14, so that the danger of accidentally detaching the wires 15 is greatly reduced.

A hollow threaded member 18 extends from the switch mechanism through the opening 6. A pull-chain 19 extends through the hollow member 18 in the well-known way, to operate the switch (not shown) of the switch mechanism. A nut 20 is screwed on the member 18. This nut is provided with a recess 21 on one side, so that, when this nut is tightened on the member 18, the flanges 8 and 9 of the sections 1 and 2 of the casing will enter the recess 21 and prevent the casing from opening. The casing can, however, be opened to remove the switch mechanism by unscrewing the nut 21 slightly, thus leaving the flanges 8 and 9 free to separate.

Reference character 22 indicates a portion of a canopy within which the casing can be enclosed and by which the device can be supported. The threaded member 18 extends through a hole in the canopy and a nut 23 on the member 18 holds the device in place.

I claim:

1. A metal casing having separable parts and being provided with an opening, said parts being hinged together opposite said opening, flanges on said parts around said opening, a threaded member extending through said opening, and a nut on said member retaining said separable parts in assembled relation.

2. A metal casing having separable parts and being provided with an opening, said parts being hinged together opposite said opening, flanges on said parts around said opening, a threaded member extending through said opening, and a nut on said member having a recess into which said flanges enter to retain said separable parts in position with respect to each other.

3. A metal casing having separable parts and being provided with an opening, said parts being hinged together opposite said opening, flanges on said parts around said opening, a threaded member extending through said opening, and means on said member provided with a recess into which said flanges project to prevent said parts from separating.

4. A metal housing for mechanism having engaging walls one of which is hinged to the other, at least one of said walls having a notch along an edge thereof, a member extending from said mechanism through said notch, and means on said member to hold said walls in engagement.

5. A metal housing for mechanism having engaging walls one of which is hinged to the other, at least one of said walls having a notch along an edge thereof, a member extending from said mechanism through said notch, and means on said member to hold said walls in engagement, said means having a depression therein and said walls having extensions entering said depression.

6. A metallic casing for an electric switch, a switch in said casing, said casing comprising separable sections and extensions on said sections, said sections being hinged together on the side of said casing opposite said extensions, a threaded nipple extending from said switch through said casing, and a nut on said nipple, said nut having a recess for said extensions.

OTTO C. BRITSCH.